3,135,733
METALLISABLE TRISAZO-DYESTUFFS
Carl Taube and Ernst Messmer, Leverkusen, and Karl-Heinz Freytag, Cologne-Stammheim, Germany, assignors to Farbenfabriken Bayer Aktiengesellschaft, Leverkusen, Germany, a corporation of Germany
No Drawing. Filed May 31, 1961, Ser. No. 113,622
Claims priority, application Germany July 9, 1960
6 Claims. (Cl. 260—157)

The invention relates to new trisazo-dyestuffs; more particularly it relates to metallisable trisazo-dyestuffs which in the free acid state correspond to the formula

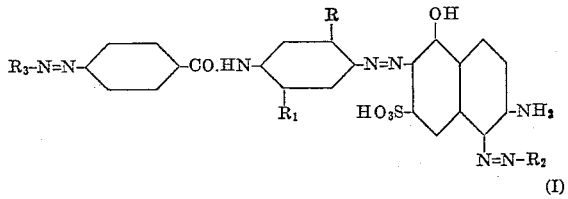

In this formula R stands for a lower alkoxy group, $R_1$ is hydrogen, lower alkyl or lower alkoxy, $R_2$ stands for the radical of a diazo component of a possibly further substituted o-aminobenzene-carboxylic acid, 4-aminobenztriazole or 5-amino-1,2,4-triazole, and $R_3$ is the radical of an aromatic o-hydroxy carboxylic acid of the benzene series.

The new metallisable trisazo-dyestuffs are obtained by tetrazotising 1-amino-4-(4'-aminobenzoyl)-aminobenzenes of the general formula

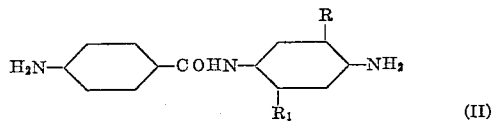

followed by coupling on one side with an aromatic o-hydroxycarboxylic acid of the benzene series and then combining the diazo-monoazo compound thus obtained with a monoazo-dyestuff of the general formula

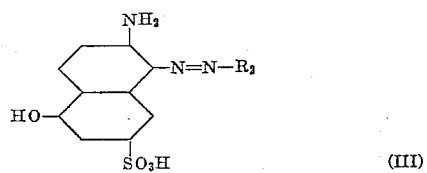

In the general Formulae II and III R, $R_1$ and $R_2$ have the same significance as above.

Examples for the diazo component $R_2$, among others, are 4-aminobenztriazole, 5-amino-1,2,4-triazole, 5-amino-1,2,4-triazole-3-carboxylic acid, 5-amino-3-methyl-1,2,4-triazole, 5-amino-3-phenyl-1,2,4-triazole, 2-aminobenzene-1-carboxylic acid and 5-nitro-2-aminobenzene-1-carboxylic acid.

The monoazo dyestuffs of the Formula III were produced in known manner by acid coupling of the diazo compounds on which the radical $R_2$ is based, with 2-amino-5-hydroxynaphthalene-7-sulphonic acid.

The coupling of the monoazo-diazo compounds, obtainable in the first stage of the process with the monoazo-dyestuff of the Formula II, is preferably carried out in alkaline medium, if desired in the presence of coupling assistants, such as formamide, dimethylformamide, pyridine and the like.

The new trisazo dyestuffs are suitable for dyeing cotton and regenerated cellulose, preponderantly grey to black shades being obtained. By after-treatment with metal salts, preferably copper salts, dyeings are obtained with very good general properties, especially very good wash and other wet fastness properties, such as fastness to milling and to perspiration and very good fastness to mercerizing and to alkalies. The dyestuffs further exhibit very good drawing power on cotton and mixed wool and cotton fabrics.

The following examples are given for the purpose of illustrating the invention without, however, limiting it thereto.

*Example 1*

28.7 parts by weight of 1-amino-2,5-dimethoxy-4-(4'-aminobenzoyl)-aminobenzene are tetrazotized in known manner and then coupled with 13.8 parts by weight of 1-hydroxybenzene-2-carboxylic acid in soda-alkaline medium to form the monoazo diazo campound. The coupling product is isolated and pasted up with 100 parts by volume of water. This paste is added to a solution of 38.5 parts by weight of the monoazo dyestuff, produced in usual way by acid coupling of diazotised 4-aminobenztriazole with 2-amino-5-hydroxynaphthalene-7-sulphonic acid, and 20 parts by weight of sodium carbonate in 800 parts by volume of water. After completion of the coupling the resulting dyestuff is precipitated with common salt, isolated and dried. It dyes cotton and regenerated cellulose grey to black according to the depth of the colour. The dyeing, after treatment on the fibre with metal salts, preferably copper salts, shows good fastness to washing and to other wet processing.

*Example 2*

31.5 parts by weight of 1-amino-2,5-diethoxy-4-(4'-aminobenzoyl)-aminobenzene are tetrazotised in known manner and coupled with 13.8 parts by weight of 1-hydroxybenzene-2-carboxylic acid in soda-alkaline medium, to form the monoazo diazo compound. The yellowish-brown coloured coupling product is isolated and pasted up with 100 parts by volume of water. This paste is added to a solution of 33.4 parts by weight of the monoazo dyestuffs, produced in the usual way by acid coupling of diazotised 5-amino-1,2,4-triazole with 2-amino-5-hydroxynaphthalene-7-sulphonic acid, and 20 parts by weight of sodium carbonate in 800 parts by volume of water. After completion of the coupling the resulting dyestuff is precipitated with common salt, isolated and dried. It dyes cotton and regenerated cellulose in grey and black shades according to the depth of the colour. The dyeings, after treatment with metal salts, preferably copper salts, show good fastness to washing.

*Example 3*

28.7 parts by weight of 1-amino-2,5-dimethoxy-4-(4'-aminobenzoyl)-aminobenzene are tetrazotised in known manner and then coupled with 13.8 parts by weight of 1-hydroxybenzene-2-carboxylic acid in soda-alkaline medium with formation of the monoazo diazo compound. The coupling product is isolated and pasted up with 100 parts by volume of water. This paste is added to a solution of 43.2 parts by weight of the monoazo dyestuff, produced in usual way by acid coupling of diazotised 5-nitro-2-aminobenzene-1-carboxylic acid with 2-amino-5-hydroxynaphthalene-7-sulphonic acid, and 20 parts by weight of sodium carbonate in 800 parts by volume of water. After completion of the coupling the resulting dyestuff is precipitated with common salt, isolated and dried. It dyes cotton and regenerated cellulose in grey to black shades according to the depth of the colour. The dyeings, after treatment with metal salts, preferably copper salts, show good fastness to washing.

*Example 4*

25.7 parts by weight of 1-amino-2-methoxy-4-(4'-aminobenzoyl)-aminobenzene are tetrazotised in known manner and coupled with 13.8 parts by weight of 1-hydroxybenzene-2-carboxylic acid in soda-alkaline medium to form the monoazo diazo compound. The coupling product is isolated and pasted up with 100 parts by volume of water. This paste is added to a solution of 37.8 parts by weight of the monoazo dyestuff, produced in usual way by acid coupling of diazotised 5-amino-1,2,4-triazole-3-carboxylic acid with 2-amino-5-hydroxynaphthalene-7-sulphonic acid, and 20 parts by weight of sodium carbonate in 800 parts by volume of water. After completion of the coupling the resulting dyestuff is precipitated with common salt, isolated and dried. It dyes cotton and regenerated cellulose, in grey to black shades according to the depth of the colour. The dyeings, after treatment with metal salts, preferably copper salts, show good fastness to washing.

A dyestuff with similar properties is obtained by using 1 - amino - 2 - methoxy - 5 - methyl-4-(4'-aminobenzoyl)-aminobenzene instead of 1-amino-2-methoxy-4-(4'-aminobenzoyl)-aminobenzene.

*Example 5*

31.5 parts by weight of 1-amino-2,5-diethoxy-4-(4'-aminobenzoyl)-aminobenzene are tetrazotised in known manner and then coupled with 13.8 parts by weight of 1-hydroxybenzene-2-carboxylic acid in soda-alkaline 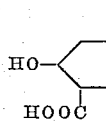 medium to the monoazo diazo compound. The coupling product is isolated and pasted up with 100 parts by volume of water. This paste is added to a solution of 34.8 parts by weight of the monoazo compound, produced in usual way by acid coupling with diazotised 5-amino-3-methyl-1,2,4-triazole with 2-amino-5-hydroxynaphthalene-7-sulphonic acid, and 20 parts by volume of sodium carbonate in 800 parts by volume of water. After completion of the coupling the resulting dyestuff is precipitated with common salt, isolated and dried. It dyes cotton and regenerated cellulose in grey to black shades according to the depth of the colour. The dyeings, after treatment with metal salts, preferably copper salts, show good fastness to washing.

We claim:

1. A trisazo-dyestuff which in the free acid state corresponds to the formula

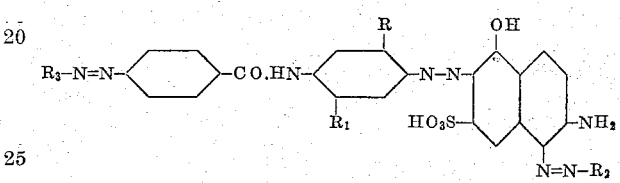

wherein R is lower alkoxy, $R_1$ stands for a member selected from the group consisting of hydrogen, lower alkyl and lower alkoxy, and $R_2$ stands for a diazo component elected from the group consisting of the residue of 5-amino-1,2,4-triazole, 5-amino-1,2,4-triazole-3-carboxylic acid, 5-amino-3-methyl 1,2,4-triazole, 5-nitro 2-amino benzene 1-carboxylic acid, and $R_3$ is 1-hydroxy phenyl-2-carboxylic acid.

2. The trisazo-dyestuff of the formula

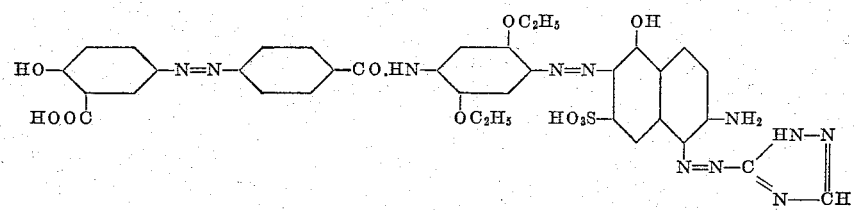

3. The trisazo-dyestuff of the formula

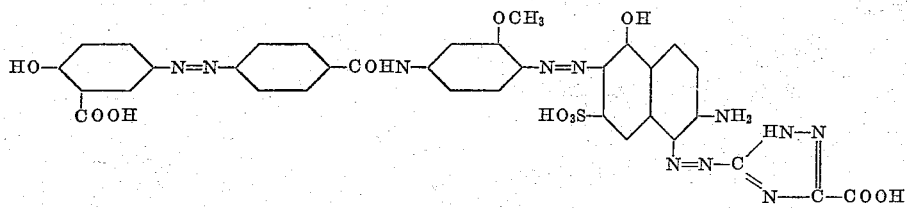

4. The trisazo-dyestuff of the formula

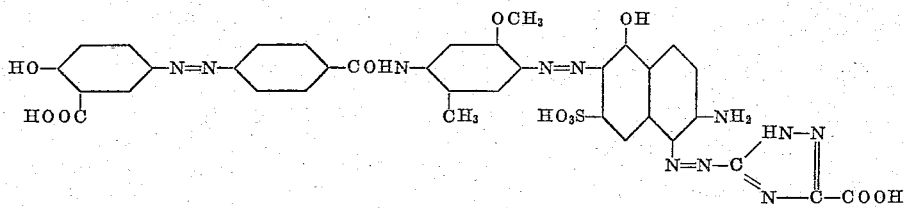

5. The trisazo-dyestuff of the formula

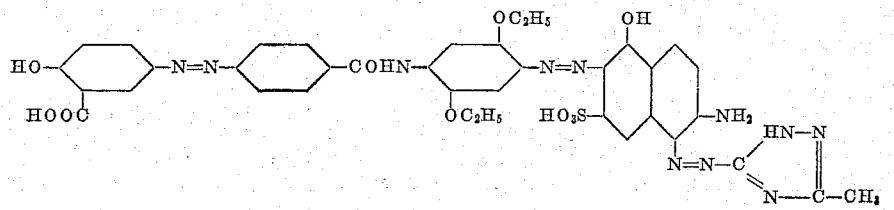

6. The trisazo-dyestuff of the formula
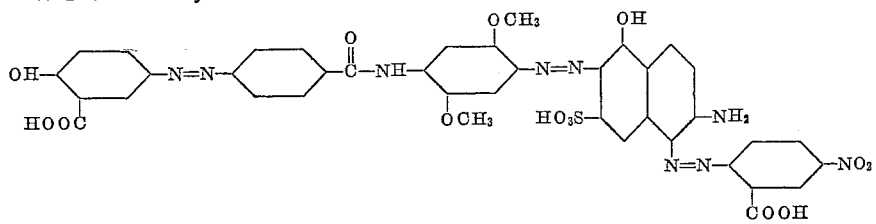
References Cited in the file of this patent
UNITED STATES PATENTS
| | | |
|---|---|---|
| 2,242,456 | Delfs et al. | May 20, 1941 |
| 2,659,721 | Bossard et al. | Nov. 17, 1953 |
| 2,817,658 | Bossard et al. | Dec. 24, 1957 |
| 2,960,497 | Messmer | Nov. 15, 1960 |